US012672133B2

(12) United States Patent
Ma et al.

(10) Patent No.: US 12,672,133 B2
(45) Date of Patent: Jun. 30, 2026

(54) METHOD, DEVICE, AND SYSTEM FOR UPLINK SIGNALING TRANSMISSION

(71) Applicant: ZTE CORPORATION, Shenzhen (CN)

(72) Inventors: Xiaoying Ma, Shenzhen (CN); Mengzhu Chen, Shenzhen (CN); Yuzhou Xu, Shenzhen (CN); Jun Xu, Shenzhen (CN); Jiajun Xu, Shenzhen (CN); Hong Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 335 days.

(21) Appl. No.: 18/511,071

(22) Filed: Nov. 16, 2023

(65) Prior Publication Data

US 2024/0089958 A1     Mar. 14, 2024

Related U.S. Application Data

(63) Continuation of application No. PCT/CN2021/122121, filed on Sep. 30, 2021.

(51) Int. Cl.
| | |
|---|---|
| *H04W 72/1268* | (2023.01) |
| *H04L 1/1812* | (2023.01) |
| *H04W 28/02* | (2009.01) |
| *H04W 72/566* | (2023.01) |
| *H04W 76/28* | (2018.01) |

(52) U.S. Cl.
CPC ....... *H04W 72/1268* (2013.01); *H04L 1/1812* (2013.01); *H04W 28/0278* (2013.01); *H04W 72/566* (2023.01); *H04W 76/28* (2018.02)

(58) Field of Classification Search
None
See application file for complete search history.

(56) References Cited

U.S. PATENT DOCUMENTS

| | | | | |
|---|---|---|---|---|
| 12,317,278 | B2 * | 5/2025 | Khoshkholgh Dashtaki | ............... H04W 72/23 |
| 12,335,178 | B2 * | 6/2025 | Nam | ..................... H04W 76/28 |
| 12,386,008 | B2 * | 8/2025 | Manolakos | ........... H04W 76/15 |
| 12,471,019 | B2 * | 11/2025 | Reial | ..................... H04W 48/12 |
| 2019/0306915 | A1 | 10/2019 | Jin et al. | |
| 2020/0037345 | A1 | 1/2020 | Ryoo et al. | |
| 2022/0368487 | A1 * | 11/2022 | Nam | ..................... H04L 5/0048 |

FOREIGN PATENT DOCUMENTS

| | | | | | |
|---|---|---|---|---|---|
| EP | | 3520521 B1 * | 6/2023 | ........... | H04W 72/23 |
| WO | WO 2013/169000 | | 11/2013 | | |
| WO | WO2020/165237 | | 8/2020 | | |

OTHER PUBLICATIONS

International Search Report issued Jun. 29, 2022 in Internatioal (PCT) Application No. PCT/CN2021/122121.

* cited by examiner

*Primary Examiner* — Eunsook Choi
(74) *Attorney, Agent, or Firm* — Crowell & Moring LLP

(57) ABSTRACT

In wireless communication, a configuration of uplink ("UL") signaling transmissions can be through a specific window or pattern. The UL transmission can be concentrated in a time period to save power. Specifically, an active time is determined as a time period for UL signals. Non-active time may include different types of UL signals. The active time may be configured and enabled under different conditions.

18 Claims, 11 Drawing Sheets

DL BWP

UL BWP

DL active time

UL active time the time when a first type of UL signal can be transmitted

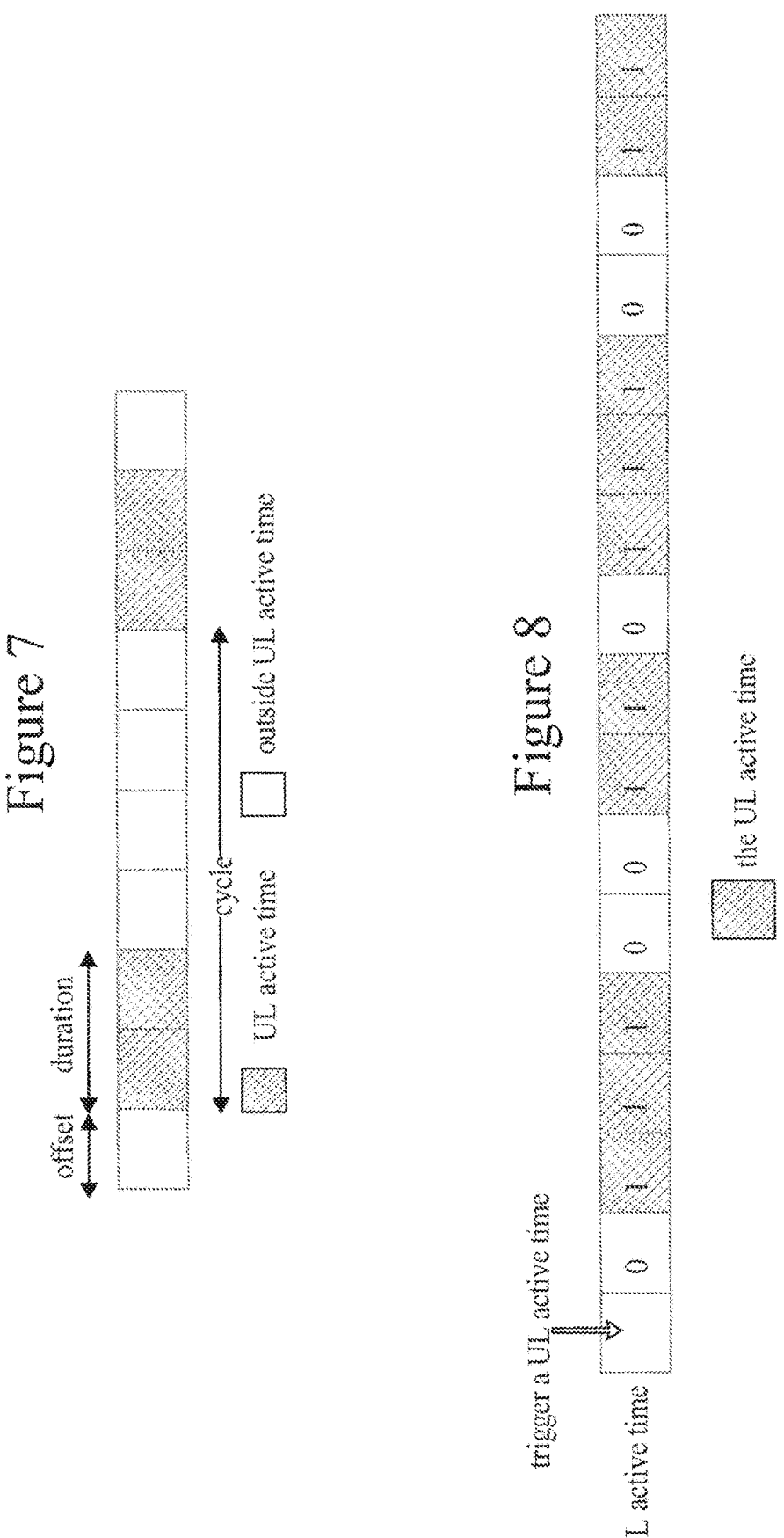

METHOD, DEVICE, AND SYSTEM FOR UPLINK SIGNALING TRANSMISSION

This application is a continuation application of PCT International Application No. PCT/CN2021/122121, filed with the China National Intellectual Property Administration, PRC on Sep. 30, 2021, which is herein incorporated by reference in its entirety.

TECHNICAL FIELD

This document is directed generally to wireless communications. More specifically, uplink signaling transmission utilizes improved timing to save power.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. The transmission rate, delay, throughput, reliability and other performance indexes of wireless communication system have been improved by using high frequency band, large bandwidth, multi-antenna and other technologies. eXtended Reality (XR) and Cloud Gaming are media applications requiring improved performance. XR includes representative forms such as Augmented Reality (AR), Mixed Reality (MR) and Virtual Reality (VR). These services need high reliability, high throughput, and low latency, while at the same time improving battery life for an improved UE experience. The battery life will also have impact on UE experience. In order to improve communications, increase the reliability while reducing UE power consumption and meet reliability requirements for the vertical industry as well as support the new generation network service, communication improvements should be made.

SUMMARY

This document relates to methods, systems, and devices for configuration of uplink ("UL") signaling transmission through a specific window or pattern. UL transmission can be concentrated in a time period to save power. Specifically, an active time is determined as a time period for UL signals. Non-active time may include different types of UL signals. The active time may be configured and enabled under different conditions.

In one embodiment, a method for wireless communication includes receiving a configuration message for active time configuration from a basestation, and transmitting uplink ("UL") signaling during an active time. The method may include that the configuration message is a high layer signaling. The method may include that the configuration message is a radio resource control ("RRC") signaling. The method may include transmitting a second type of UL signaling during a time other than the active time, wherein the UL signaling other than the second type is transmitted only during the active time. The second type of UL signaling includes at least one of a physical uplink shared channel ("PUSCH") scheduled by a Medium Access Control ("MAC") Random Access Response ("RAR") or scheduled by MAC fallbackRAR or for MsgA PUSCH transmission, a physical random access channel ("PRACH") preamble, a certain type of SRS, a certain type of CSI report, hybrid automatic repeat request ("HARQ"), a certain type of PUSCH, a different type of a physical uplink control channel ("PUCCH"), or UL signaling with high priority. The transmitting is from a user equipment ("UE") to the basestation and the receiving the configuration message is at the UE from the basestation. The active time comprises an UL active time or a downlink ("DL") active time. The DL active time comprises at least one of a discontinuous reception ("DRX") active time when DRX is configured, a time duration when drx-ondurationTimer is running, a time duration when drx-inacitivityTimer is running, a time duration when a PDCCH skipping is not activated, a time duration when a default SSSG is used, or a time during a monitoring of a physical downlink control channel ("PDCCH") by a user equipment ("UE"). The active time configuration comprises an UL active time configuration which is a time period determined by the UL active time configuration, further wherein the UL active time configuration comprises at least one of a duration, an offset, a cycle value, a cycle number, a pattern, a timer, a start parameter, or an end parameter. The UL active time is determined by at least a cycle which comprises M sub cycles, wherein each of the sub cycles has one duration and a cycle value. The UL active time is determined by at least one cycle, a M duration, and a M offset, further wherein at least one of the M duration appears at at least one of the M offsets.

In one embodiment, the method for wireless communication further includes transmitting a first type of UL signaling during an UL active time, wherein the first type of UL signaling includes at least one of a scheduling request ("SR"), a buffer status report ("BSR"), a PUSCH, a sounding reference signal ("SRS"), Channel-state information ("CSI") report, or a first type PUCCH. The UL active time occurs every cycle. The UL active time continues during a time period when a timer has not expired. The timer can be retriggered upon a condition, wherein the condition is based on at least one of a physical uplink shared channel ("PUSCH"), downlink control information ("DCI") signal, a scheduling request ("SR") signal, a buffer status report ("BSR"), or a physical downlink control channel ("PDCCH") signal. The UL active time is triggered or enabled when a condition satisfied, wherein the condition is associate with at least one of a radio resource control ("RRC") signal, a MAC control element ("CE") signal, a layer one ("L1") signal, a discontinuous reception ("DRX") active time, PDCCH monitoring behavior, a UE capability, a DRX configuration, a secondary cell ("SCell") dormancy indication, a cross slot scheduling indication, or a timer. The offset indicates a minimum time duration between a reference point and a beginning of the UL active time. The condition is satisfied when receiving a downlink control information ("DCI") indicating a physical downlink control channel ("PDCCH") skipping, or receiving a DCI indicates activate an UL active time, or after a timer expires. The UL active time is determined by an UL active time configuration, further wherein the UL active time configuration is associated with at least one of a layer one ("L1") signaling, a high layer signaling, a discontinuous reception ("DRX") parameter, a traffic parameter, a time division duplex ("TDD") pattern, a configured grant ("CG") configuration, a search space set configuration, a physical downlink control channel ("PDCCH") skipping duration, a timer, the UE assistance information, a UL signaling, a pattern, a physical downlink shared channel ("PDSCH") decoding procedure time, a minimum scheduling offset, or a physical uplink shared channel ("PUSCH") preparation procedure time. The UL active time is determined by the UL active time configuration, further wherein the UL active time configuration is associated with a traffic parameter which comprises a periodicity and the cycle of the UL active time is the same as periodicity of the traffic. The UL active time is determined by the UL active time configuration, further wherein the UL active time configuration is associated with at least a search space set configuration and a cycle of the UL active time is equal to periodicity of the search space set. The transmission of the UL signaling is not restricted in active time if a condition satisfied, wherein the condition is associated with at least one of an upper layer signaling which includes UE or downlink control information ("DCI"). An activation and deactivation of the UL active time is indicated by a Medium Access Control Common Element ("MAC CE") signaling. The UL active time is configured by at least one of a medium access control ("MAC") entity, a bandwidth part ("BWP"), a cell, a cell group, or the UE.

In another embodiment, a method for wireless communication includes transmitting a configuration message for active time configuration from a basestation to a user equipment ("UE"), and receiving uplink ("UL") signaling during an active time. The method includes receiving a second type of UL signaling during a time other than the active time, wherein the UL signaling other than the second type is transmitted only during the active time. The second type of UL signaling includes at least one of a physical uplink shared channel ("PUSCH") scheduled by a Medium Access Control ("MAC") Random Access Response ("RAR") or scheduled by MAC fallbackRAR or for MsgA PUSCH transmission, a physical random access channel ("PRACH") preamble, a certain type of SRS, a certain type of CSI report, hybrid automatic repeat request ("HARQ"), a certain type of PUSCH, a different type of a physical uplink control channel ("PUCCH"), or UL signaling with high priority. The active time comprises an UL active time or a downlink ("DL") active time. The DL active time comprises at least one of a discontinuous reception ("DRX") active time when DRX is configured, a time duration when drx-ondurationTimer is running, a time duration when drx-inacitivityTimer is running, a time duration when a PDCCH skipping is not activated, a time duration when a default SSSG is used, or a time during a monitoring of a physical downlink control channel ("PDCCH") by a user equipment ("UE"). The active time configuration comprises an UL active time configuration which is a time period determined by the UL active time configuration, further wherein the UL active time configuration comprises at least one of a duration, an offset, a cycle value, a cycle number, a pattern, a timer, a start parameter, or an end parameter. The UL active time is determined by at least a cycle which comprises M sub cycles, wherein each of the sub cycles has one duration and a cycle value. The UL active time is determined by at least one cycle, a M duration, and a M offset, further wherein at least one of the M duration appears at at least one of the M offsets.

In one embodiment, the method for wireless communication further includes receiving a first type of UL signaling during an UL active time, wherein the first type of UL signaling includes at least one of a scheduling request ("SR"), a buffer status report ("BSR"), a PUSCH, a sounding reference signal ("SRS"), Channel-state information ("CSI") report, or a first type PUCCH. The UL active time occurs every cycle. The UL active time continues during a time period when a timer has not expired. The timer can be retriggered upon a condition, wherein the condition is based on at least one of a physical uplink shared channel ("PUSCH"), downlink control information ("DCI") signal, a scheduling request ("SR") signal, a buffer status report ("BSR"), or a physical downlink control channel ("PDCCH") signal. The UL active time is triggered or enabled when a condition satisfied, wherein the condition is associate with at least one of a radio resource control ("RRC") signal, a MAC control element ("CE") signal, a layer one ("L1") signal, a discontinuous reception ("DRX") active time, PDCCH monitoring behavior, a UE capability, a DRX configuration, a secondary cell ("SCell") dormancy indication, a cross slot scheduling indication, or a timer. The offset indicates a minimum time duration between a reference point and a beginning of the UL active time. The condition is satisfied when receiving a downlink control information ("DCI") indicating a physical downlink control channel ("PDCCH") skipping, or receiving a DCI indicates activate an UL active time, or after a timer expires. The UL active time is determined by an UL active time configuration, further wherein the UL active time configuration is associated with at least one of a layer one ("L1") signaling, a high layer signaling, a discontinuous reception ("DRX") parameter, a traffic parameter, a time division duplex ("TDD") pattern, a configured grant ("CG") configuration, a search space set configuration, a physical downlink control channel ("PDCCH") skipping duration, a timer, the UE assistance information, a UL signaling, a pattern, a physical downlink shared channel ("PDSCH") decoding procedure time, a minimum scheduling offset, or a physical uplink shared channel ("PUSCH") preparation procedure time. The UL active time is determined by the UL active time configuration, further wherein the UL active time configuration is associated with a traffic parameter which comprises a periodicity and the cycle of the UL active time is the same as periodicity of the traffic. The UL active time is determined by the UL active time configuration, further wherein the UL active time configuration is associated with at least a search space set configuration and a cycle of the UL active time is equal to periodicity of the search space set. The transmission of the UL signaling is not restricted in active time if a condition satisfied, wherein the condition is associated with at least one of an upper layer signaling which includes UE or downlink control information ("DCI"). An activation and deactivation of the UL active time is indicated by a Medium Access Control Common Element ("MAC CE") signaling. The UL active time is configured by at least one of a medium access control ("MAC") entity, a bandwidth part ("BWP"), a cell, a cell group, or the UE.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 7 shows another embodiment of active time determination.

FIG. 8 shows another embodiment of active time determination.

FIG. 9 shows an embodiment of an uplink ("UL") transmit window.

FIG. 13 shows an embodiment of active time with schedule request ("SR") transmit occasion.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
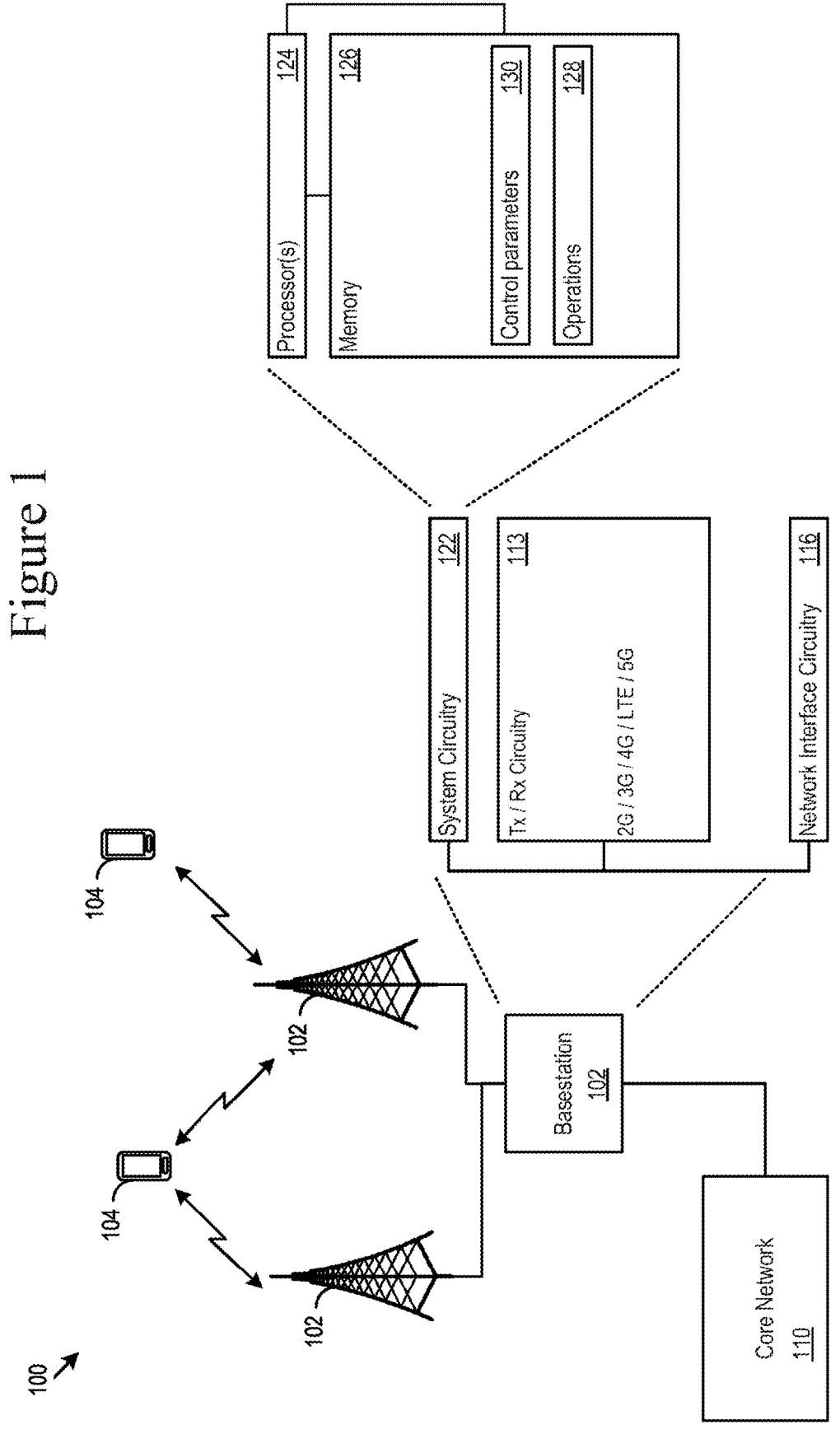
FIG. 1 shows an example basestation.
Figure 2:
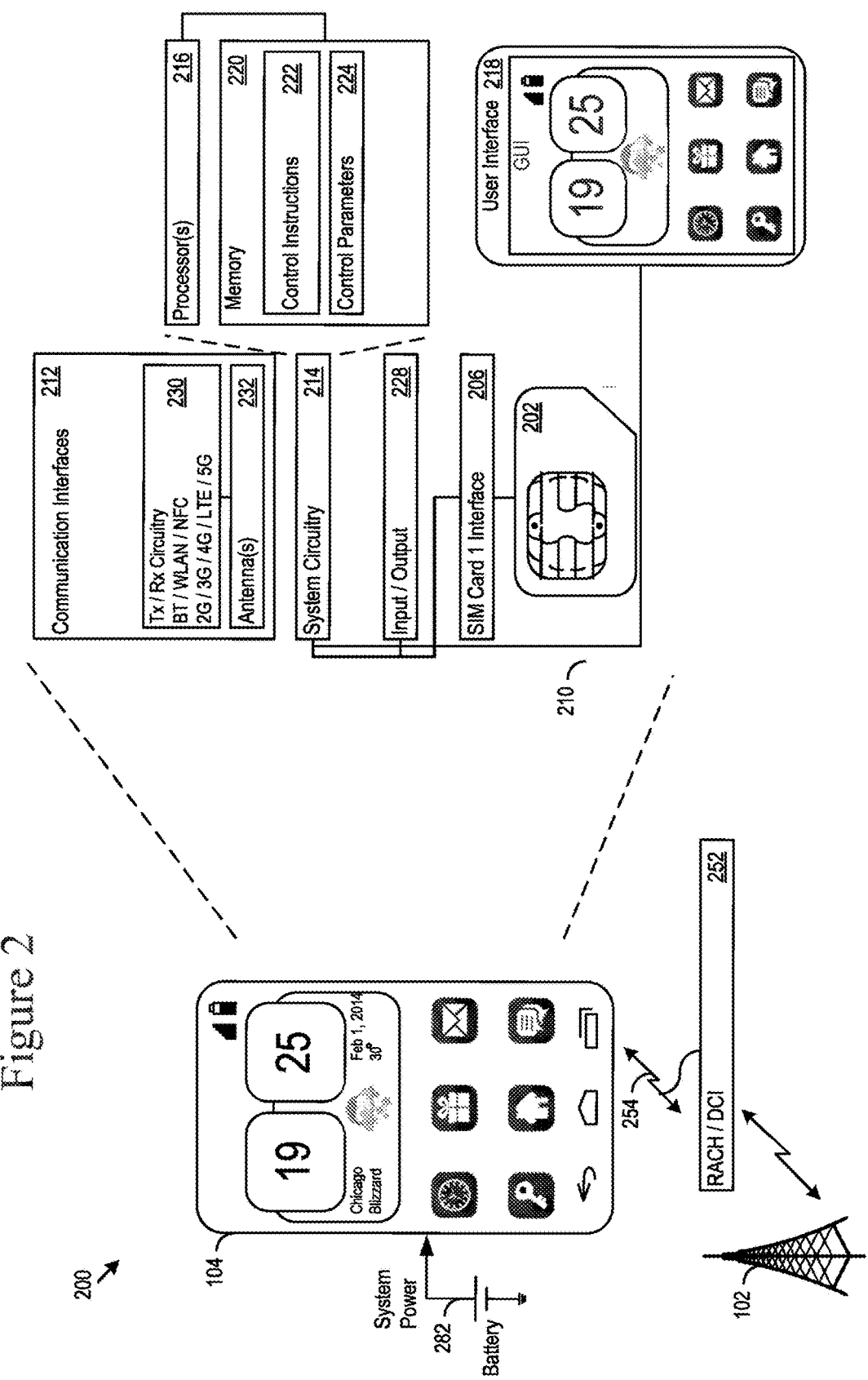
FIG. 2 shows an example random access (RA) messaging environment.

Radio resource control ("RRC") is a protocol layer between UE and the basestation at the IP level (Network Layer). There may be various Radio Resource Control (RRC) states, such as RRC connected (RRC CONNECTED), RRC inactive (RRC INACTIVE), and RRC idle (RRC IDLE) state. As described, UE can transmit data through a Random Access Channel ("RACH") protocol scheme or a Configured Grant ("CG") scheme or grant scheme. CG may be used to reduce the waste of periodically allocated resources. The basestation or node may assign CG resources to eliminate packet transmission delay and to increase a utilization ratio of allocated periodic radio resources. The CG scheme is merely one example of a protocol scheme for communications and other examples, including but not limited to RACH, are possible. The wireless communications described herein may be through radio access including new radio ("NR") access. A CG configuration or CG scheme may include a periodicity. The offset of a Type 1 CG (e.g. offset related to the reference system frame number ("SFN")) may be configured by RRC signaling, while the offset of a Type 2 CG (e.g. offset related to a downlink control information ("DCI")) is indicated by a DCI. FIGS. 1-2 show example radio access network ("RAN") nodes (e.g. basestations) and user equipment and messaging environments.

If UE has UL data to be transmitted, the UE will transmit a Scheduling request ("SR") or a buffer status report ("BSR") to the basestation, and the basestation may send an uplink ("UL") grant with an allocation of a physical uplink shared channel ("PUSCH") resource. The UL indication may indicate whether or not UE has UL data to be transmitted. In one embodiment, a '1' means there are some data to be transmitted. The SR may be transmitted using a physical uplink control channel ("PUCCH") if a UE does not have available PUSCH resource. The IE SchedulingRequestResourceConfig determines physical layer resources on PUCCH while the UE may send the dedicated scheduling request ("D-SR"). The SchedulingRequestResourceConfig IE includes schedulingRequestResourceId (i.e. ID of the SR resource), schedulingRequestID (i.e. ID of the associated SR), periodicityAndOffset (i.e. periodicity and offset of the SR resource which determine the transmit occasion). One SR configuration has a dedicated SR resource. The BSR can indicate the buffer size of the UL data. SR can be transmitted in a PUCCH, while BSR can be transmitted in a PUSCH.

Configured grant ("CG") configuration includes a resource for PUSCH. If UE has UL data to be transmitted, the UE can send SR in SR transmission occasions to indicate there is UL data to be transmitted. UE can send a BSR if there have available uplink scheduling ("UL-SCH") resources to indicate the buffer size of the UL data. If the SR configuration is associated with a CG configuration, the transmission occasions for SR and BSR may be coordinated (e.g. the transmission occasion for SR and BSR may be interlaced), and the delay for UL data may be reduced.

Discontinuous reception ("DRX") is a power saving technique. The basic mechanism of DRX is to configure a DRX cycle for UE, and a drx-ondurationTimer to begin a DRX cycle. During the drx-ondurationTimer, UE is in 'DRX On' state and continues monitoring a physical downlink control channel ("PDCCH") that carries downlink control information ("DCI"). If the UE successfully decodes a PDCCH, the UE stays awake (in 'DRX On' state) and starts the inactivity timer. The UE can go to sleep in 'DRX off' state after drx-ondurationTimer or drx-inactivityTimer expires. In 'DRX off', UE does not monitor PDCCH. The DRX maybe used in eXtended Reality ("XR") since the XR traffic is period transmitted. However, if DRX is off and UE transmits a SR, the UE will switch back to DRX On and monitor PDCCH. In some embodiments of XR service, uplink pose/control traffic will be generated every 4 ms, and the periodicity of video traffic is ⅟₆₀ second, so UE may transmit SR frequently and may affect the DRX procedure (e.g., UE switch back to DRX ON). Hence, frequent UL transmission can decrease the time when UE in 'DRX off' and increase UE power consumption. Default search space set group ("SSSG") may be a SSSG in which UE monitors PDCCH if no PDCCH monitoring behavior indication is received.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit signaling with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic (system circuitry) 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104.

In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Figure 3:
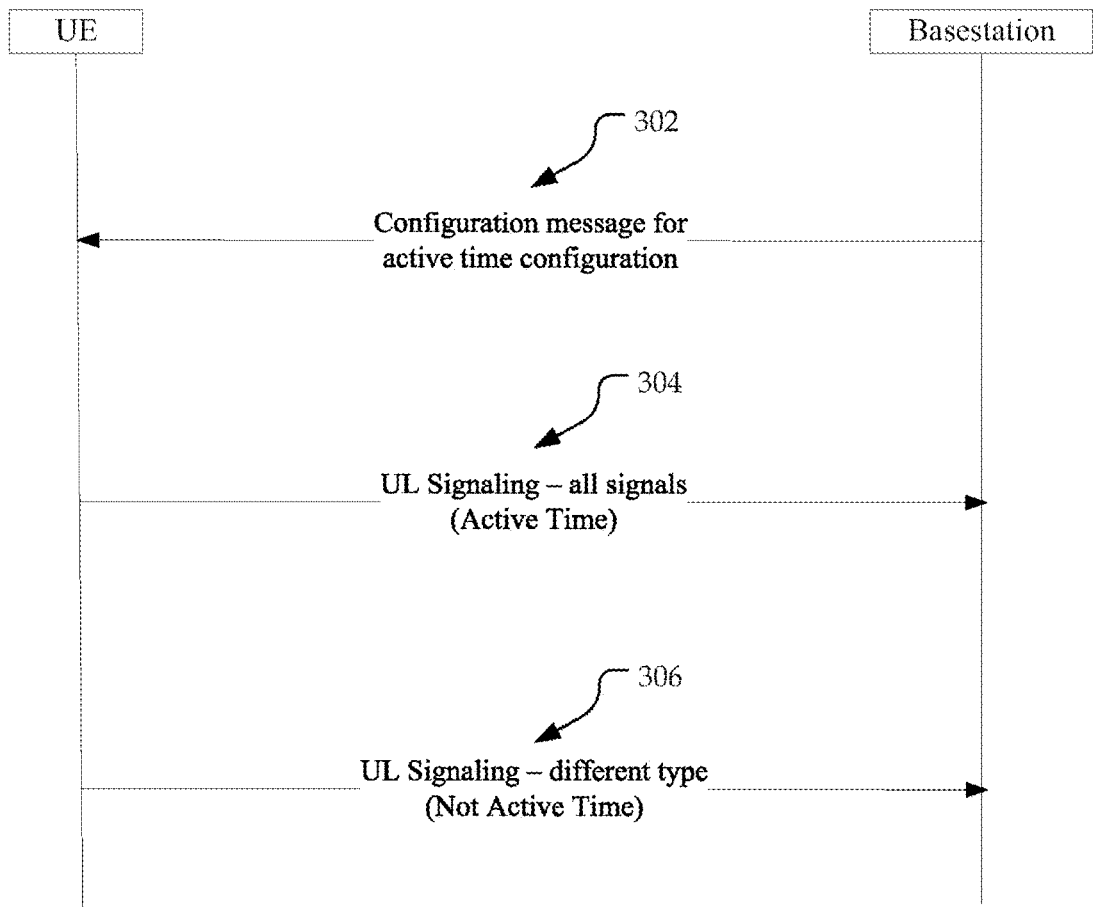
FIG. 3 shows one embodiment of uplink ("UL") signaling.
Figure 5:
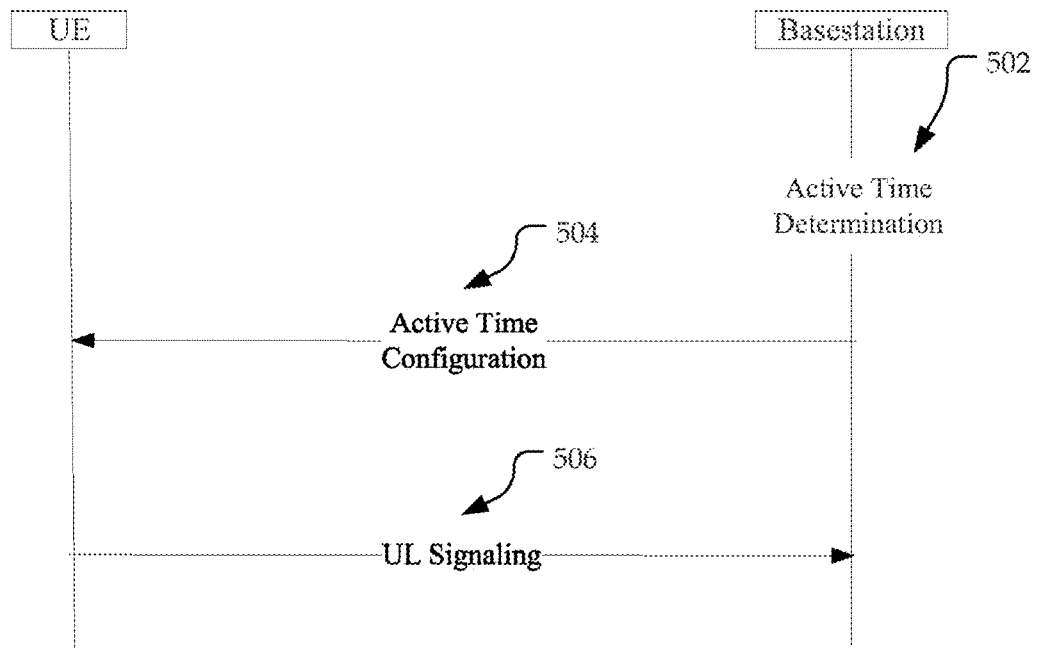
FIG. 5 shows one embodiment of active time determination and configuration.
Figure 6:
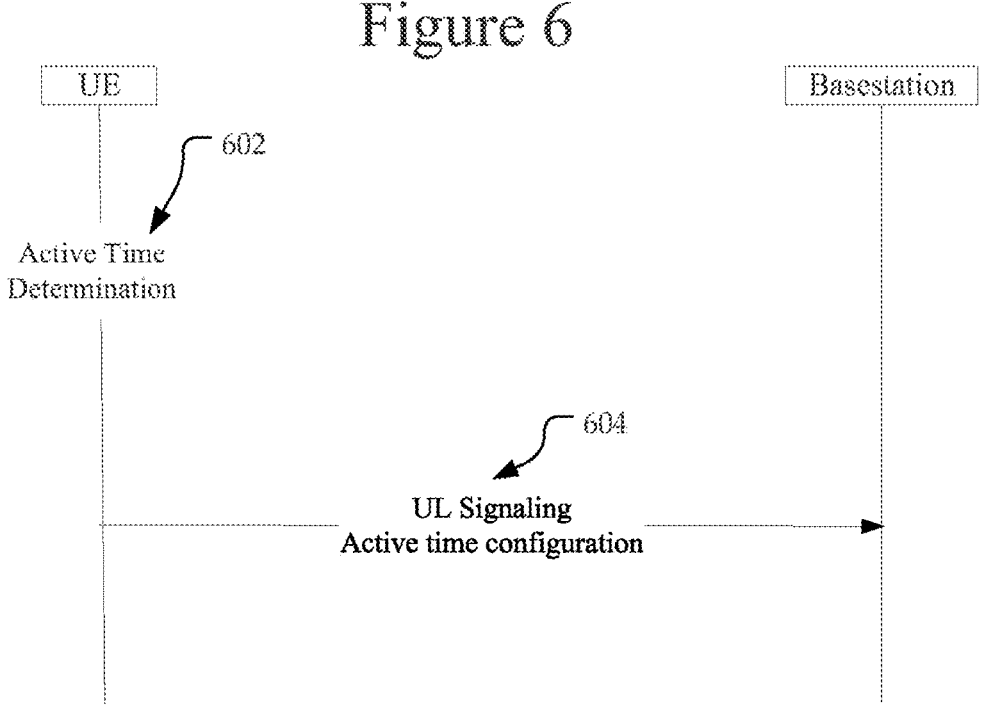
FIG. 6 shows another embodiment of active time determination and configuration.

In wireless communication, a configuration of uplink ("UL") signaling transmissions can be through a specific window or pattern. The UL transmission can be concentrated in a time period to save power. Specifically, an active time is determined as a time period for UL signals. Non-active time may include different types of UL signals. FIG. 3 shows different signaling for active time and non-active time. FIGS. 5-6 show the active time may be determined and configured. In addition, the active time may be triggered or enabled under different conditions.

FIG. 3 shows one embodiment of uplink ("UL") signaling. In one embodiment, the user equipment ("UE") receives a configuration message 302 for active time configuration, which may establish active time as compared with non-active time. Based on the configuration, the UE transmits UL signaling 304 during active time to the basestation. The UE also transmits a different type of UL signaling 306 to the basestation during non-active time. The UL signaling during active can include all signals 304, while the UL signaling during non-active time may include a different type of signals 306. In some embodiments, the different type may be referred to as a second type, while all the signals 304 transmitted may be referred to as a first type. The active time versus non-active time is further described below. In addition, the type of signal during the different time periods is further described. The active time may include at least an UL active time and/or a DL active time.

In some embodiments, UE can transmit a first type of UL signaling during the UL active time duration. The UE may transmit a second type of UL signaling outside the UL active time duration. In some embodiments, UE can not transmit a first type of UL signaling outside the active time duration. The UE may transmit the second type of UL signaling outside the active time duration. In other embodiments, all types of signals may be transmitted during active time, while only certain types (e.g. different types or second types) can be transmitted during non-active time. In other embodiments, the active time includes an UL active time and a DL active time, UE may transmit all UL signaling in DL active time, UE may transmit first type of UL signaling in UL active time. In other embodiments, UE may transmit all or the first type of UL signaling in active time, UE can not transmit any UL signaling outside the active time. Specifically, there may be at least four embodiments:

UE can transmit all UL signaling in active time (DL active time and/or UL active time), while UE can transmit a second type of UL signaling outside active time.

UE can transmit all UL signaling in DL active time, UE can transmit first type of UL signaling in UL active time, while UE can transmit a second type of UL signaling outside active time.

UE can transmit first type of UL signaling in active time, while UE can transmit a second type of UL signaling outside active time.

UE can transmit UL signaling in active time, while UE cannot transmit any UL signaling outside active time.

The first type of UL signaling may include at least one of a scheduling request ("SR"), a buffer status report ("BSR"), a physical uplink shared channel ("PUSCH"), a sounding reference signal ("SRS"), a channel-state information ("CSI") report, a uplink control information ("UCI"), or a first type of physical uplink control channel ("PUCCH"). The first type PUCCH may include at least one of the following: PUCCH format 3, PUCCH format 4, PUCCH format 1, PUCCH format 2.

The second type of UL signaling include at least one of a physical uplink shared channel ("PUSCH") scheduled by a medium access control ("MAC") Random Access Response ("MAC RAR"), a PUSCH scheduled by a MAC fallback RAR, a MsgA PUSCH transmission, a physical random access channel ("PRACH") preamble, a certain type of SRS, a certain type of CSI report, hybrid automatic repeat request ("HARQ"), a certain type of PUSCH, or a different type of a physical uplink control channel ("PUCCH") signal, a UL signaling with higher (or high) priority. The certain type of SRS may be referred to as a first type of SRS. In some embodiments, the first type (or certain type) of SRS may include at least one of the following a period SRS or aperiodic SRS. In another embodiments, the first type (or certain type) of SRS may include at least one of the following a period SRS or semi-persistent SRS. The certain type of CSI report may be referred to as a first type of CSI report. In some embodiments, the first type (or certain type) of CSI report may include at least one of a periodic CSI report, aperiodic CSI report, a CSI report on PUCCH, or a CSI report on a physical uplink shared channel ("PUSCH"). In other embodiments, the first type (or certain type) of CSI report may include at least one of the following a period CSI report, a CSI report on PUCCH, or semi-persistent CSI report. The different type of a PUCCH signal may be referred to as a second type. The second type of PUCCH may include at least one of PUCCH format 0, PUCCH format 1, or PUCCH format 2. In some embodiments, the certain type of PUSCH include at least CG PUSCH or PUSCH includes MAC CE signaling. In another embodiments, the certain type of PUSCH include at least PUSCH scheduled by UL grant or PUSCH includes MAC CE signaling.

In some embodiments, the maximum number of a kind of UL signaling may not be greater than A in a time duration outside the active time. A may be a non-negative integer and less than 10 in some embodiments. The type of UL signaling may include at least one of a different (or second) type of UL signaling, a SR, or a BSR.

The active time may include an uplink ("UL") active time and/or a downlink ("DL") active time. In some embodiments, the active time may be a UL active time or in other embodiments, the active time may be a DL active time. The UE can transmit a first type of UL signaling in at least one of the DL active time, or the UL active time. In some embodiments, the first type may include all UL signaling, while a second type (only during non-active time) is a subset of UL signaling. In some embodiments, the first type is a subset of all UL signaling. DL active time may include a discontinuous reception ("DRX") active time if DRX is configured. DL active time may also include a time when UE is monitoring a physical downlink control channel ("PDCCH") signal. DL active time may include a time duration when drx-ondurationTimer is running. DL active time may include a time duration when drx-inactivityTimer is running. DL active time may include a time duration when UE monitoring PDCCH according to a default SSSG. DL active time may include a time duration when a PDCCH skipping is not triggered.

In some embodiments, the UE can transmit a first type of UL signaling during the intersection of DL active time and UL active time. In other words, the time when a first type of UL signal can be transmitted is when the DL active time and the UL active time overlap.

Figure 4A:
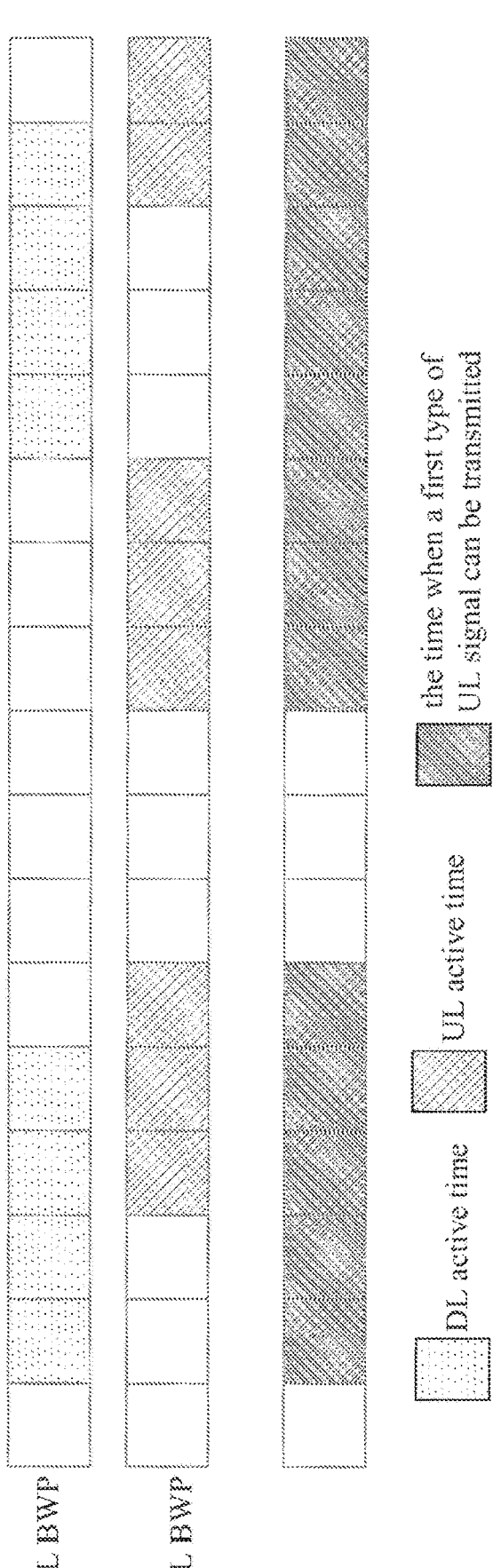
FIG. 4a shows one embodiment of active time with both UL active time and DL active time.

FIG. 4a illustrates another embodiment in which active time is during either DL active time or UL active time. In other words, the time when a first type of UL signal can be transmitted can be either during DL active time or during UL active time.

Figure 4B:
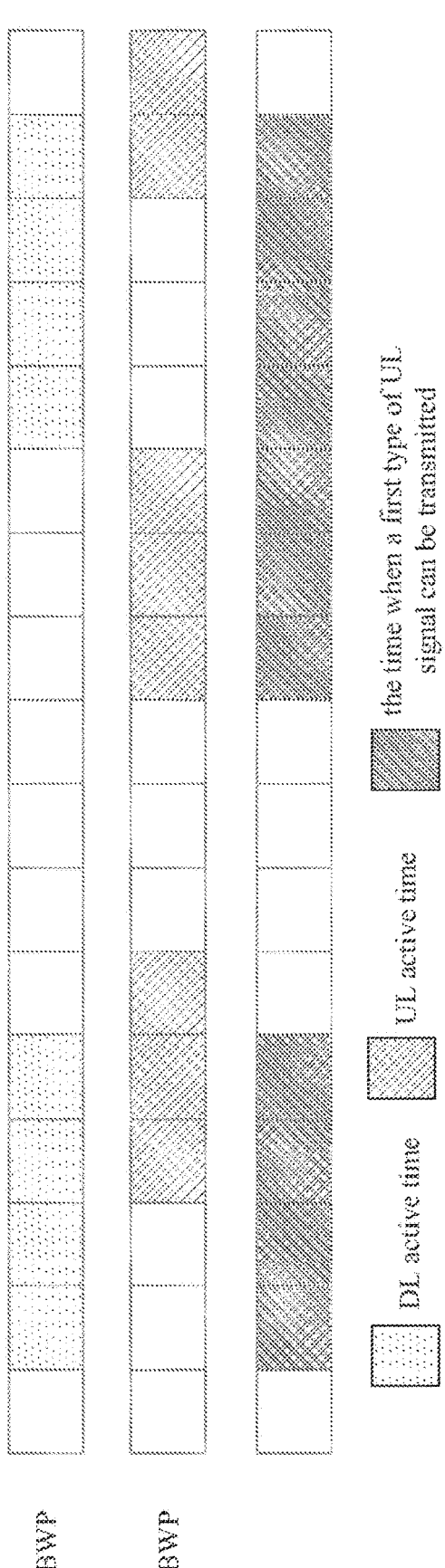
FIG. 4b shows another embodiment of active time with both UL active time and DL active time.

FIG. 4b shows another embodiment of active time with both UL active time and DL active time. If the UL active time is overlapped with part of the DL active time, the UE can transmit a first type of UL signaling during the DL active time, but cannot transmit in the UL active time outside of the DL active time. If UL active time is not overlapped with a part of DL active time, the UE can transmit a first type of UL signaling during UL active time and DL active time. In another embodiment, the UE can transmit a first type of UL signaling during the UL active time.

FIG. 5 shows one embodiment of active time determination and configuration. An active time determination 502 is made at the basestation before or after an active time configuration indication 504 is communicated. The UL signaling 506 is transmitted. The transmission may be according to the transmission discussed with respect to FIG. 3. The transmission of an UL signaling may be in active time or the UL signaling may indicate (or trigger) a behavior (activate or disable or change of) an active time. The basestation can transmit an indication of the configuration 504.

FIG. 6 shows another embodiment of active time determination and configuration. The active time determination 602 is made at the UE and the UL signaling 604 includes an active time configuration. The active time determination and active time configuration are further described below.

The UL active time is determined based on or being associated a UL active time configuration with at least one of a duration, an offset, a discontinuous reception ("DRX") configuration, a cycle value, a cycle number, a pattern, a timer, a start parameter, or an end parameter. The UL active time configuration may be referred to as UL active time parameters. The UL active time is a time period/duration for UL signaling transmission of certain types of UL signals. As discussed the certain type of UL signal may include all UL signals. The certain type of UL signal may include a first type of UL signals. When UL active time is configured, the UE may not continuously transmit UL signaling. The units of duration, timer, or offset or UL active time parameters is at least one of a millisecond, slots, symbol, mini-slot, frame, or sub-frame. The cycle value indicates a length of a cycle. The cycle number indicates a number of cycle of an UL active time. The start parameter indicates a start location of an UL active time. An end parameter indicates an end location of an UL active time. The duration indicates a length of an UL active time in a cycle if a cycle value is configured or a length of an UL active time. The offset is indicates a minimum time duration between a reference point and a beginning of the UL active time or indicates a time duration between a reference point and a beginning of the UL active time. The UL active time may be configured by high layer signaling (e.g., RRC signaling) or a layer one ("L1") signaling (e.g., downlink control information ("DCI")). High layer signaling may include RRC signaling or Medium Access Control Common Element ("MAC CE") signaling.

In some embodiments, the configuration of UL active time may also be referred to as activation or triggering. The UL active time configuration is used or triggered or activated once receiving the configuration. In some embodiments, there may be a timer in the configuration of active time, the timer may be triggered when an UL active time is triggered. The active time continues while the timer is not expired. The configuration of UL active may be performed by RRC signaling. RRC configures at least some parameters of UL active time. These parameters may be referred to as the UL active time configuration. The UL active time configuration is triggered, activated, or enabled based on one or more parameters. In some embodiments, the UL active time is used once the UL active time is configured. The UL active time may be used after a L1 indication or other conditions (e.g. timer, etc.)

FIG. 7 shows another embodiment of active time determination. In FIG. 7, the UL active time may be determined based on an association with at least one of a duration, an offset or a cycle value. For example, the UL active time may occur every cycle value. In each cycle, the length of the UL active time may be determined by duration. The location in each cycle may be determined by at least offset.

FIG. 8 shows another embodiment of active time determination. The UL active time is determined based on an association with a pattern. The pattern may configured by high layer signaling or indicated by a downlink control information ("DCI"). The pattern may be a bitmap. For example, in the bitmap '0001111100', each bit corresponds to a slot with a '1' signifying UL active time, and a '0' signifying UL non-active time. The pattern may include a bitmap and a cycle number. For example, when the bitmap is '01110011', and the cycle number is 2, the UL active time is shown in FIG. 8. In some embodiments, each bit of the bitmap corresponds to one or more slots. In some embodiments, each bit of the bitmap corresponds to one or more symbols. In some embodiments, each bit of the bitmap corresponds to one or more UL slots. In some embodiments, each bit of the bitmap corresponds to one or more UL symbols. In some embodiments, the pattern is determined by a start and length indicator value ("SLIV"). The SLIV may indicate both a start and length parameter value.

Figure 9:
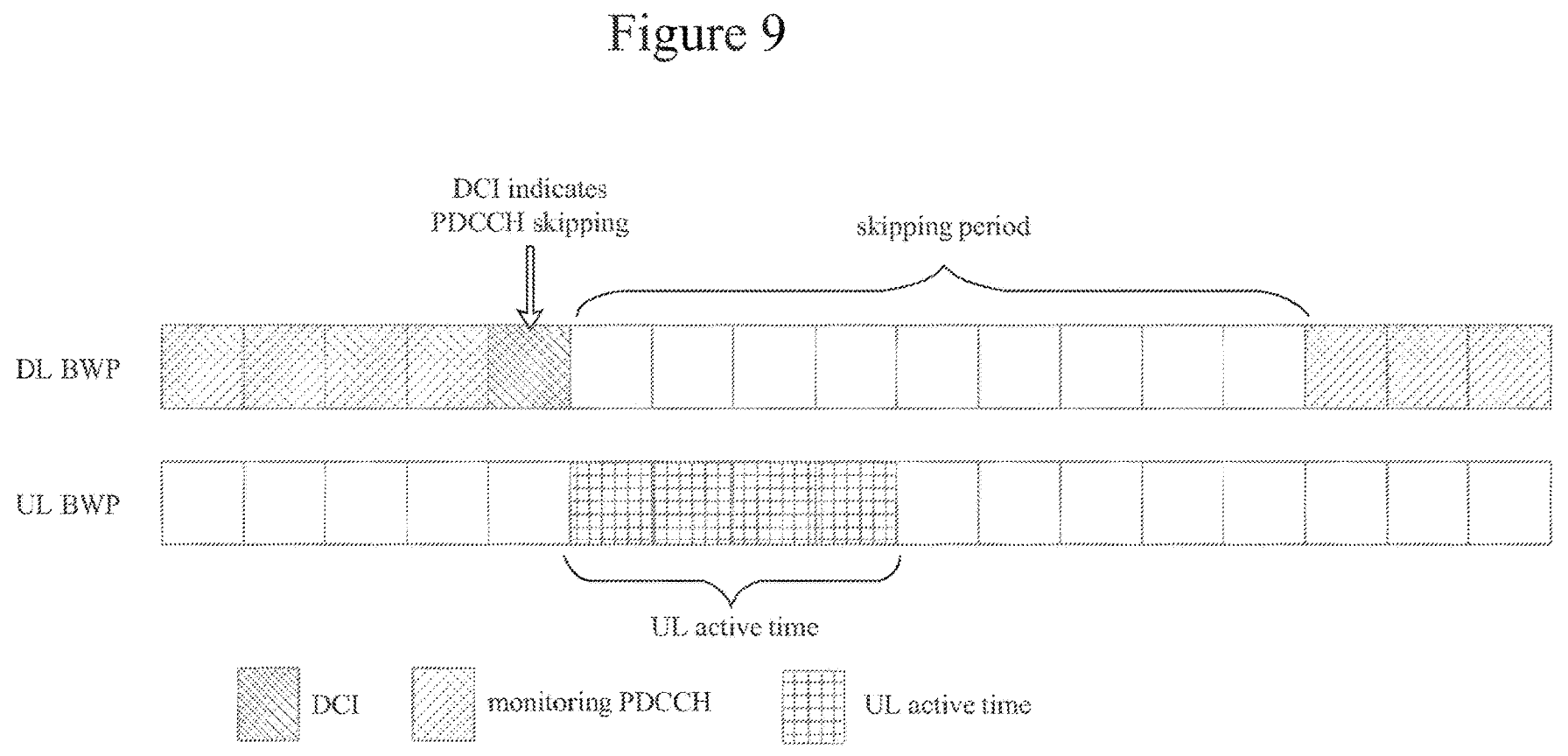

FIG. 9 shows an embodiment of an uplink ("UL") transmit window. The UL active time is determined based on an association with at least one of a duration, an offset, a cycle value or a cycle number. For example, the UL active time is determined with a duration and an offset as shown in FIG. 9, in which the UL active time is after receiving a DCI indication of physical downlink control channel ("PDCCH") skipping. The length of the UL active time is indicated by duration, the location of UL active time is according to an offset (e.g., offset=0), and the reference point of the offset is the last slot of the downlink control information ("DCI").

In other embodiments, the determination of active time may be based on an association with a duration, a start parameter, an end parameter, and/or a reference point. The start parameter indicates a start position of an UL active time. The end parameter indicates an end position of an UL active time. The start parameter and end parameter may be associated with an offset. The start parameter indicates a time duration between the start position of the UL active time and a reference point. The end parameter indicates a time duration between an end position of an UL active time and the reference point. The reference point may be predefined or associated with at least one of a discontinuous reception ("DRX") parameter, DRX active time, UE physical downlink control channel ("PDCCH") monitoring behavior, or layer one ("L1") signaling.

In other embodiments, the determination of active time may be based on an association with a duration, an offset, and a reference point. The offset indicates a minimum time duration between a reference point and the first slot/symbol/millisecond/subframe/frame of the UL active time. The UL active time starts at the first UL symbol/slot after the offset from the reference point. The reference point is associated with at least one of: a S slot (or flexible slot), a uplink (U) slot, a Uplink symbol, a time division duplex ("TDD") pattern, a DRX parameter, a subframe, a system frame number (SFN), or a L1 signaling. The S slot is a slot that includes DL symbols and can receive DL signaling and UL symbols for transmitting UL signaling. The U slot is a slot that includes UL symbols for transmitting UL signaling. The TDD pattern is configured by high layer signaling or predefined for TDD UL/DL configuration. This may include a slot configuration period, a number of slots with downlink symbols, a number of downlink symbols, a number of slots with uplink symbols, or a number of uplink symbols. In some examples, the reference point may be associated with at least a TDD pattern. The reference point may be the first symbol of one TDD pattern. The TDD pattern may be the first cycle after trigger UL active time. In one example, the reference point is associated with at least a TDD pattern and DRX parameter. The reference point may be the first symbol of one TDD pattern and the TDD pattern may be the first cycle after trigger UL active time and before DRX onduration. In some examples, the reference point is the last slot/symbol of a L1 signaling. The L1 signaling may be the signaling trigger for an UL active time. In some examples, the reference point is the first Uplink slot/symbol after receiving a L1 signaling.

Figures 10, 11:
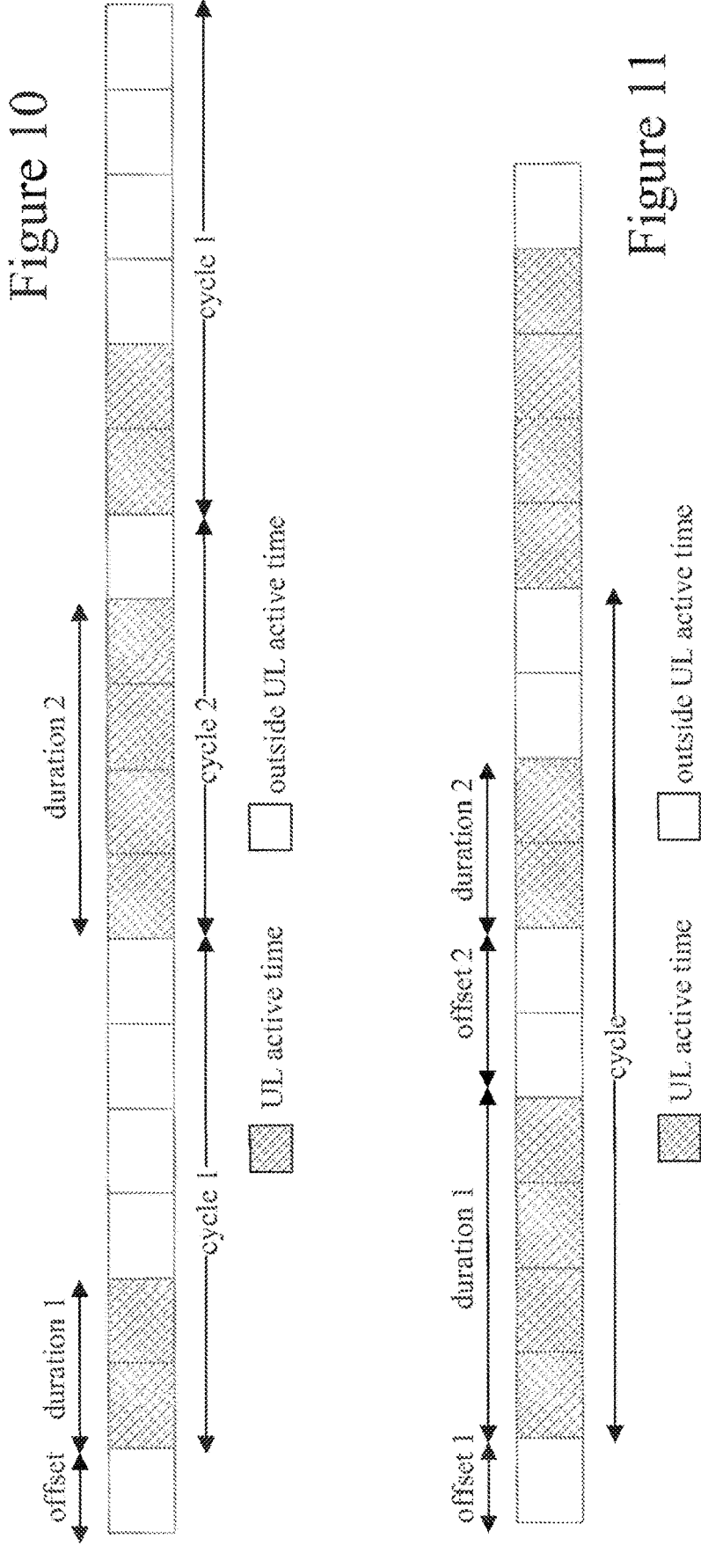
FIG. 10 shows an embodiment for active time determination.
FIG. 11 shows another embodiment for active time determination.

FIG. 10 shows an embodiment for active time determination. The UL active time may be determined by at least one of: a duration, an offset, a reference point, a cycle value. For example, the UL active time is determined by at least M cycles, where each cycle has a duration and a cycle value. The M cycles may form a larger cycle. FIG. 10 illustrates an example where M=2. In some embodiments, the larger cycle will occur every larger cycle. In some embodiments, the UL active time is configured to include more than one cycle. If an UL active time is triggered, a first cycle parameter may be used. After the UL active time is triggered, if the UE does not transmit a UL signaling during a time duration, the next cycle parameter will be used. If UE transmits a UL signaling during a time duration, the UL active time will change to use the first or previous cycle parameter. In some embodiments, the time duration is a timer or the number of cycle.

FIG. 11 shows another embodiment for active time determination. In this example, UL active time is determined by at least one of a cycle, M duration, and M offset, where duration may appear at an offset. FIG. 11 illustrates an example where M=2.

The active time determination or configuration may utilize a timer. The timer can be triggered such that the active time is until the timer expires. The timer can be triggered or retriggered upon one or more conditions. There may be a number of different conditions for activating/reactivating the timer in different embodiments. The condition(s) may be associated with at least one of a physical uplink shared channel ("PUSCH"), a layer one ("L1") signaling (e.g. downlink control information ("DCI") signal or a scheduling request ("SR") signal), a buffer status report ("BSR"), or a physical downlink control channel ("PDCCH") signal. In some embodiments, the condition(s) is satisfied at least one of when the UE transmits a PUSCH; when the UE receives a DCI with UL grant or DL assignment; when the UE transmits a positive SR; when the UE transmits a BSR; or when the UE receives a PDSCH. The UL active time is continued while the timer is not expired.

The configuration of active time was shown in FIGS. 5-6. The configuration may include active time parameter(s). The configuration (or parameter) for UL active time may be associated with at least one of a L1 signaling (e.g., DCI), a high layer signaling, a DRX parameter, a traffic parameter (e.g., periodicity, packet delay budget, frame per second, etc.), a time division duplex ("TDD") pattern, a configured grant ("CG") configuration, a physical downlink control channel ("PDCCH") skipping duration, a search space set configuration, a timer, a UE assistance information, a UL signaling, a pattern, a N1, a N2, a k0, a k2, a k1, a k0min, a k2 min, a physical downlink shared channel ("PDSCH") decoding procedure time, a physical uplink shared channel ("PUSCH") preparation procedure time. The parameters included above may include:

K0min: minimum slot offset between a DCI and its scheduled PDSCH.

K2 min: minimum slot offset between a DCI and its scheduled PUSCH.

K0min and K2 min may be referred to minimum scheduling offset.

K1: slot offset between a PDSCH and hybrid automatic repeat request ("HARQ")-Acknowlede ("ACK").

K0: slot offset between a DCI and its scheduled PDSCH.

K2: slot offset between a DCI and its scheduled PUSCH.

N1: PDSCH decoding time.

N2: PUSCH preparation time.

PDCCH monitoring behavior may include at least one of PDCCH skipping behavior, search space set group switching behavior, cross-slot scheduling behavior, wake-up behavior, monitor PDCCH according to a search space set configuration behavior, a SCell dormancy behavior, or stop PDCCH monitor behavior.

UE assistance information may report a recommend parameter value of UL active time. The parameter value of UL active time may reference the parameter values report by UE assistance information. UE capability may report the supported value range of UL active time, the parameter value of UL active time should not out of the range reported by UE capability. The offset may be associated with a reference point. The reference point includes or is associated with at least one of a L1 signaling, a system frame number ("SFN"), a timer expire or start, a time of changing PDCCH monitoring behavior, or an indication of a PDCCH monitoring behavior. For example, the reference point is the slot when change PDCCH monitoring behavior or receiving an indication of a PDCCH monitoring behavior. For another example, the reference point is the first slot in a frame in which trigger an UL active time according to a SFN. The offset, duration, timer, start parameter, or pattern may be associated with K0, K1 K2, K0min, K2 min, N1, N2, a physical downlink shared channel ("PDSCH") decoding procedure time, or a physical uplink shared channel ("PUSCH") preparation procedure time. For example, the offset may be the same as the K0. In another example, the duration is greater than or equal to K1 or K2 or K0min or K2 min. In another example, the offset is less than K1 or K2. In another example, the bitwidth is greater than K1 or K2. In another example, the start location of an UL active time is at least after N1 or N2 or a physical downlink shared channel ("PDSCH") decoding procedure time or a physical uplink shared channel ("PUSCH") preparation procedure time.

In some embodiments, the UL transmit pattern may include or be associated with at least one of a discontinuous reception ("DRX") configuration. For example, the offset of the UL transmit pattern may be the same as the offset of DRX configuration. In another embodiment, the cycle (C_UL) of the UL transmit pattern may be determined to be associated with the cycle (C_DRX) of the DRX configuration. C_UL=M*C_DRX, where M is greater than 0 and less than 1.

In some embodiments, the offset is a duration between the first slot when DRX-OnDurationTimer starts and the first slot of the duration of the UL transmit pattern (or UL active time). In other embodiments, the bitwidth of the bitmap is associated with the DRX configuration. For example, the bitwidth is determined by operator (DRX cycle—DRX onduration timer). the operator is used to change the unit of DRX parameter to the unit for bitwidth. In some embodiments, the configuration (or parameter) for UL active time is associated with a PDCCH skipping duration. For example, the duration of UL active time is less than the PDCCH skipping duration. In other embodiments, the configuration (or parameter) for UL active time is associated with a search K0min: minimum slot offset between a DCI and its scheduled PDSCH.

space set configuration. For example, the cycle of UL active time is the same as or equal to the periodicity of the search space set. In some embodiments, the configuration (or parameter) for UL active time is associated with a traffic parameter. For example, the cycle of UL active time is the same as or larger than the periodicity of the traffic. In another example, the cycle of UL active time is less than the packet delay budget ("PDB"). In some embodiments, the configuration (or parameter) for UL active time may be changed by DCI or UL signaling (e.g., SR, or BSR). For example, radio resource control ("RRC") signaling configures more then one set of parameters for UL active time, and DCI indicates one set of parameters for UL active time is valid. In another example, the DCI indicates a change of UL active time parameters. In some embodiments, the configuration (or parameter) for UL active time may be associated with a CG configuration. For example, the cycle value (also referred to periodicity) of UL active time may be the same periodicity as the periodicity of the CG.

The active time may be enabled, triggered, or activated based on satisfaction of a condition. The active time may be referred to as being enabled, triggered, or activated and those terms may have the same meaning and be used interchangeably herein. In some embodiments, enable or activate means enable the function of transmit UL signaling in active time. Enable the function of transmit UL signaling in active time may mean the UE should be following the restriction. Enable the function of transmit UL signaling in active time may also mean UE support the function of transmit UL signaling in active time. Disabling the function of transmit UL signaling in active time may mean UE can transmit UL signaling at any time. The condition may be referred to as a second condition to distinguish from the condition discussed above (i.e. first condition) which is unrelated to the triggering of active time. The second condition may be associated with at least one of a RRC signaling, a medium success control ("MAC") control element ("CE") signaling, a layer one ("L1") signaling, discontinuous reception ("DRX") active time, physical downlink control channel ("PDCCH") monitoring behavior, UE capability, or DRX configuration. The UL active time may be enabled (i.e. triggered/activated/used/etc.) if the second condition satisfied. Some examples of satisfaction of the second condition include:

Radio resource control ("RRC") signaling including the UL active time configuration that is configured;

A UE capability indicating UE support UL active time is transmitted/or received;

A UE is outside the DRX active time;

A UE is in physical downlink control channel ("PDCCH") skipping duration, which indicates the UE stops monitoring PDCCH during the duration;

A UE is monitoring PDCCH associated with a search space set group 1 or 2 or a SSSG other than default SSSG;

A non-zero K0min or K2 min is applied;

A SCell is switch to a dormancy BWP;

A UE receives an indication of at least one of: a PDCCH skipping indication, a SSSG indication, a wake up indication, a not wake up indication, a SCell dormancy indication, a minimum scheduling offset indication;

A physical downlink shared channel ("PDSCH") is received;

A positive scheduling request ("SR") is transmitted;

A buffer status report ("BSR") is transmitted;

A physical uplink shared channel ("PUSCH") is received;

A DCI with an uplink ("UL") grant or downlink ("DL") assignment is received;

A L1 signaling (e.g. DCI) indicates start of the UL active time; and/or

A MAC CE signaling indicates start of the UL active time.

The UL active time may be triggered according to at least one of RRC signaling, a MAC CE signaling, or a layer one ("L1") signaling. The MAC CE signaling or L1 signaling (e.g. DCI or SR) may have a field to trigger the UL active time. The trigger indication may be implicit indicated or may be explicitly indicated. The implicit indicate may means the indication or trigger of UL active time is associated with other indications. For example, a PDCCH skipping indication indicate UE perform a PDCCH skipping and also trigger an UL active time. A PDCCH skipping indicate UE not perform a PDCCH skipping will not trigger an UL active time. The explicitly indicate may mean a field may be a specific field or an existing field that is modified for storing this indication. The field may be used to indicate or trigger the UL active time. The modified field may be used to indicate other information in other examples and is modified to indicate or trigger the UL active time. Whether the field exists is associated with at least one of a DCI, a Radio Network Temporary Identifier ("RNTI"), a high layer signaling, a UE capability, a frequency range ("FR") type, or a sub-carrier space ("SCS"). The field existence means the bitwidth of the field is greater than zero. The field exists when at least one of the following conditions are satisfied:

The DCI is a first type of DCI;

The first type of DCI includes at least one of a DCI format 0-1, a DCI format 1-1, a DCI format 0-2, a DCI format 1-2, a DCI format 0-0, a DCI format 1-0, a DCI format 2-0, or a DCI format 2-6;

The RNTI is first type of RNTI;

The first type of RNTI may include at least one of a cell RNTI ("C-RNTI"), a configuration scheduling RNTI ("CS-RNTI"), Modulation and Coding Scheme RNTI ("MCS-C-RNTI"), or PS-RNTI;

The parameter of the UL active time is configured;

An enable signaling (e.g. enabling the UL active time) is configured; and/or

A UE capability (e.g., which indicates support UL active time) is transmitted/received.

In some embodiments, a DCI triggers the UL active time. The DCI may be a non-scheduling DCI. Non-scheduling DCI may refer to a DCI that does not schedule a data. The triggering indication may be indicated in at least one of the following fields: a minimum applicable scheduling offset indication field, a search space set group switch indication field, a secondary Cell ("SCell") dormancy indication field, a modulation and coding scheme ("MCS") field, a new data indicator field, a redundancy version field, a HARQ process number field, antenna port(s) field, and/or demodulation reference signal ("DMRS") sequence initialization field. Any of these fields may be modified or re-interrupted to include the trigger or indication of the UL active time.

In some embodiments, if a UE is provided one configuration for UL active time, and a field in the DCI indicates the DCI is used to activate or deactivate an UL active time, validation of the DCI format may be achieved if all fields for the DCI format are set according to Table 1 and/or Table 2 shown below:

TABLE 1

| Activation/trigger of UL active time. | | | |
| --- | --- | --- | --- |
| | DCI format 0__0/ 0__1/0__2 | DCI format 1__0/ 1__2 | DCI format 1__1 |
| HARQ process number | set to all '0's | set to all '0's | set to all '0's |
| Redundancy version | set to all '0's | set to all '0's | For the enabled transport block: set to all '0's |

TABLE 2

| Deactivation or disabling of UL active time. | | |
| --- | --- | --- |
| | DCI format 0__0/ 0__1/0__2 | DCI format 1__0/ 1__1/1__2 |
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |

If a UE is provided more than one configuration for the UL active time, and a field in the DCI indicates the DCI is used to activate or deactivate an UL active time, a value of the HARQ process number field in a DCI format may indicate an activation for a corresponding UL active time configuration with a same value as provided by high layer signaling. Validation of the DCI format may be achieved if the RV field for the DCI format is set as in Table 3 shown below:

TABLE 3

| Activation/trigger of UL active time. | | | |
| --- | --- | --- | --- |
| | DCI format 0__0/ 0__1/0__2 | DCI format 1__0/ 1__2 | DCI format 1__1 |
| Redundancy version | set to all '0's | set to all '0's | For the enabled transport block: set to all '0's |

An UL active time may be triggered based on an association with at least one of a DRX parameter, a PDCCH monitoring behavior, a SCell dormancy indication, a cross slot scheduling indication, a PDCCH monitoring behavior indication, or a timer. For example, an UL active time is triggered after the last slot of DRX active time. In another example, an UL active time is triggered after a timer is expired. The timer may be at least one of a DRX On Duration ("onduration") timer, a DRX inactivity timer, a PDCCH skipping timer, or a search space set group switching timer.

In some embodiments, there may be further fallback behavior. The UL active time may be disabled if a different condition is satisfied. This condition may be referred to as the third condition and may be associated with at least one of a upper layer ("UL") signaling (e.g., UE assistance information, BSR, SR), a priority information, a physical random access channel ("PRACH"), a beam failure, a high layer signaling, or a DCI. In some embodiments, the third condition may be satisfied when:

The UE transmits a SR;

A PRACH procedure or beam failure is triggered;

Receipt of a signaling (e.g., MAC CE or DCI) indicating to disable the UL active time;

The UE transmits a buffer status report ("BSR") which indicates a buffer size larger than N, where N is an integer greater than 100;

The UE transmits an SR/BSR with high priority information; or

The value which is calculated by subtract latency of a packet from a packet delay budget ("PDB") is less than a threshold value, which may be an integer greater than 0 and less than 10. The latency of a packet may refer to the time duration count from the time when packet is generated or ready to be transmitted to the current time.

The UL active time may further be configured or triggered based on individual entities. For example, the configuration or triggering may be per MAC entity, per bandwidth part ("BWP"), per cell, per cell group, or per UE.

Figure 12:
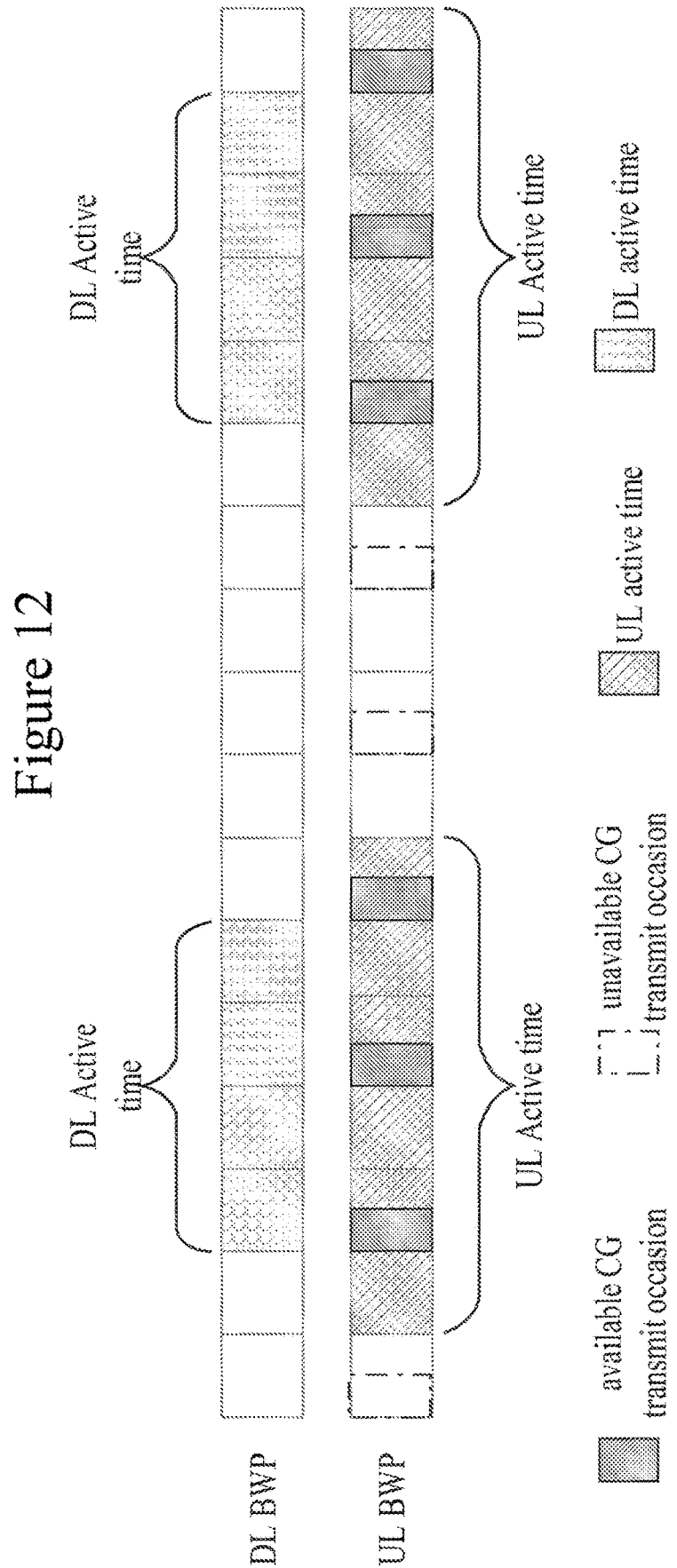
FIG. 12 shows an embodiment of active time with configured grant ("CG") transmit occasion.

FIG. 12 shows an embodiment of active time with configured grant ("CG") transmit occasion. The UL active time and DL active time are shown along with available CG transmit occasion and unavailable CG transmit occasion in this example. The available CG transmit occasion is associated with either UL active time and/or DL active time. In some embodiments, the CG transmit occasion is outside at least one of UL active time and DL active time and is unavailable. The available CG transmit occasion allows for the UE to transmit CG PUSCH in the CG PUSCH resource. The CG transmit occasion may be unavailable which means the UE may not transmit CG PUSCH in the assigned CG PUSCH resource. The assigned CG PUSCH resource of the unavailable CG PUSCH resource may then be re-assigned by the basestation.

Figure 13:
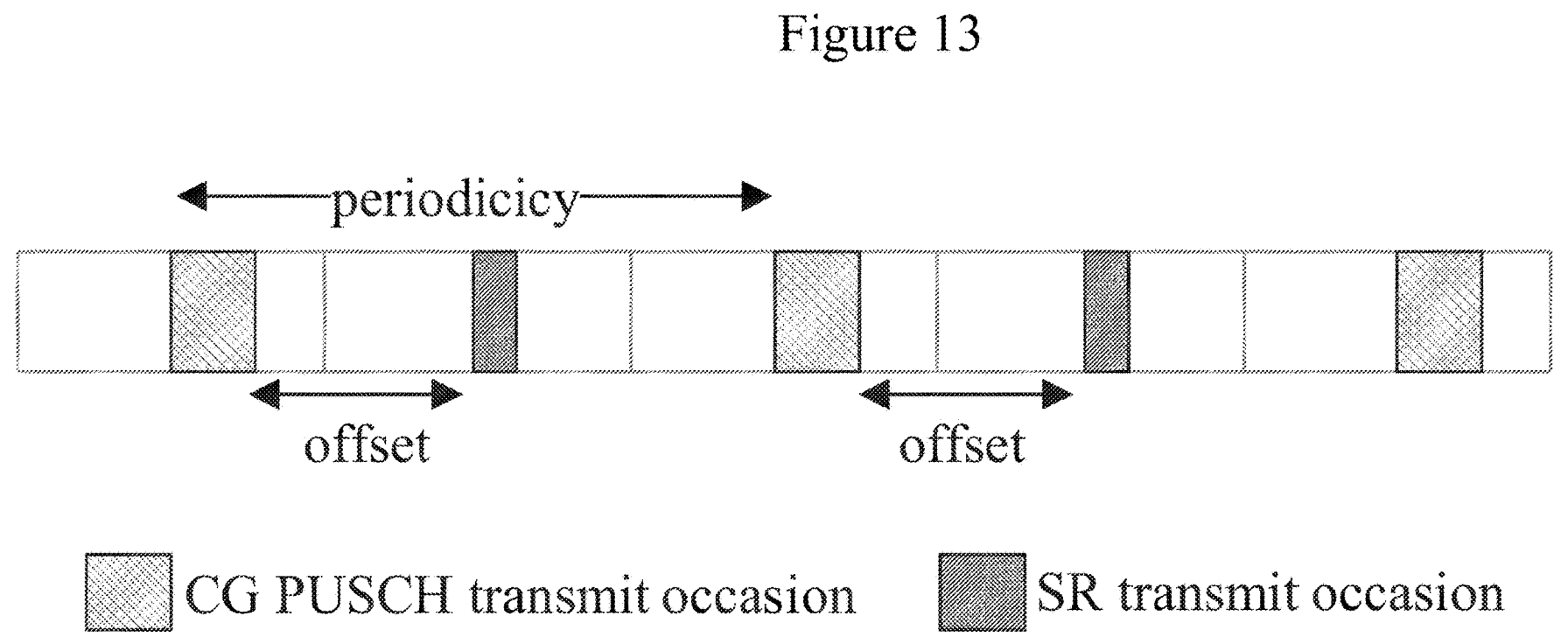

FIG. 13 shows an embodiment of active time with schedule request ("SR") transmit occasion. In some embodiments, a SR configuration or a SR resource is related to or associated with a configured grant ("CG") configuration. In some embodiments, the SR resource for the SR configuration is configured to be associated with a CG configuration. The periodicity (P_SR) of the SR resource is associated with a CG configuration. For example, the P_SR may be less than or equal to the periodicity (P_CG) of CG configuration. For example, P_SR=M*P_CG. where M is greater than 0 and less than or equal to 1. The offset of SR resource is associated with a CG configuration. For example, the offset is a duration between the last symbol (or slot) of a CG-PUSCH and the first symbol (or slot) of a SR transmission occasion. In another example, the offset is a duration between a CG-PUSCH and a SR transmission occasion.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless communication, comprising:
receiving a configuration message for active time configuration from a base station, wherein the active time configuration comprises an uplink ("UL") active time configuration, the UL active time configuration comprises at least one of a duration, an offset, a cycle value, a cycle number, a pattern, a timer, a start parameter, or an end parameter, and an UL active time is determined by at least a cycle which comprises M sub cycles, each of the sub cycles has one duration and a cycle value; and
transmitting UL signaling during an active time.

2. The method of claim 1, further comprising:
transmitting a second type of UL signaling during a time other than the active time, wherein the UL signaling other than the second type is transmitted only during the active time.

3. The method of claim 2, wherein the second type of UL signaling includes at least one of a physical uplink shared channel ("PUSCH") scheduled by a Medium Access Control ("MAC") Random Access Response ("RAR") or scheduled by MAC fallbackRAR or for MsgA PUSCH transmission, a physical random access channel ("PRACH") preamble, a certain type of SRS, a certain type of CSI report, hybrid automatic repeat request ("HARQ"), a certain type of PUSCH, a different type of a physical uplink control channel ("PUCCH"), or UL signaling with high priority.

4. The method of claim 1, wherein the transmitting is from a user equipment ("UE") to the base station and the receiving the configuration message is at the UE from the base station.

5. The method of claim 4, wherein the active time comprises an UL active time or a downlink ("DL") active time.

6. The method of claim 5, wherein the DL active time comprises at least one of a discontinuous reception ("DRX") active time when DRX is configured, a time duration when drx-ondurationTimer is running, a time duration when drx-inacitivity Timer is running, a time duration when a PDCCH skipping is not activated, a time duration when a default search space set group ("SSSG") is used, or a time during a monitoring of a physical downlink control channel ("PDCCH") by a user equipment ("UE").

7. The method of claim 1, wherein the UL active time is determined by at least one cycle, a M duration, and a M offset, further wherein at least one of the M duration appears at least one of the M offsets.

8. The method of claim 1, wherein the offset indicates a minimum time duration between a reference point and a beginning of the UL active time.

9. The method of claim 1, further comprising:

transmitting a first type of UL signaling during an UL active time, wherein the first type of UL signaling includes at least one of a scheduling request ("SR"), a buffer status report ("BSR"), a PUSCH, a sounding reference signal ("SRS"), Channel-state information ("CSI") report, or a first type PUCCH.

10. The method of claim 4, wherein the UL active time continues during a time period when a timer has not expired, wherein the timer can be retriggered upon a condition, wherein the condition is based on at least one of a physical uplink shared channel ("PUSCH"), downlink control information ("DCI") signal, a scheduling request ("SR") signal, a buffer status report ("BSR"), or a physical downlink control channel ("PDCCH") signal.

11. The method of claim 4, wherein the UL active time is triggered or enabled when a condition satisfied, wherein the condition is associated with at least one of a radio resource control ("RRC") signal, a MAC control element ("CE") signal, a layer one ("L1") signal, a discontinuous reception ("DRX") active time, PDCCH monitoring behavior, a UE capability, a DRX configuration, a secondary cell ("SCell") dormancy indication, a cross slot scheduling indication, or a timer.

12. The method of claim 11, wherein the condition is satisfied when receiving a downlink control information ("DCI") indicating a physical downlink control channel ("PDCCH") skipping, or receiving a DCI indicates activation of an UL active time, or after a timer expires.

13. The method of claim 4, wherein the UL active time is determined by an UL active time configuration, further wherein the UL active time configuration is associated with at least one of a layer one ("L1") signaling, a high layer signaling, a discontinuous reception ("DRX") parameter, a traffic parameter, a time division duplex ("TDD") pattern, a configured grant ("CG") configuration, a search space set configuration, a physical downlink control channel ("PDCCH") skipping duration, a timer, a UE assistance information, a UE capability, an UL signaling, a pattern, a physical downlink shared channel ("PDSCH") decoding procedure time, a minimum scheduling offset, or a physical uplink shared channel ("PUSCH") preparation procedure time.

14. The method of claim 13, wherein the UL active time is determined by the UL active time configuration, further wherein the UL active time configuration is associated with a traffic parameter which comprises a periodicity and the cycle of the UL active time is the same as periodicity of the traffic.

15. The method of claim 13, wherein the UL active time is determined by the UL active time configuration, further wherein the UL active time configuration is associated with at least a search space set configuration and a cycle of the UL active time is equal to periodicity of the search space set.

16. The method of claim 1, wherein the transmission of the UL signaling is not restricted in active time if a condition satisfied, wherein the condition is associated with at least one of a UE assistance information, a buffer status report ("BSR"), a scheduling request ("SR"), a priority information, a physical random access channel ("PRACH"), a beam failure, a high layer signaling, or downlink control information ("DCI").

17. A method for wireless communication, comprising:

transmitting a configuration message for active time configuration from a base station to a user equipment ("UE"), wherein the active time configuration comprises an uplink ("UL") active time configuration, the UL active time configuration comprises at least one of a duration, an offset, a cycle value, a cycle number, a pattern, a timer, a start parameter, or an end parameter, and an UL active time is determined by at least a cycle which comprises M sub cycles, each of the sub cycles has one duration and a cycle value; and receiving uplink UL signaling during an active time.

18. A wireless communications apparatus comprising:

a memory operable to store computer-readable instructions; and a processor circuitry operable to read the computer-readable instructions, the processor circuitry when executing the computer-readable instructions is configured to:

receive a configuration message for active time configuration from a base station, wherein the active time configuration comprises an uplink ("UL") active time configuration, the UL active time configuration comprises at least one of a duration, an offset, a cycle value, a cycle number, a pattern, a timer, a start parameter, or an end parameter, and an UL active time is determined by at least a cycle which comprises M sub cycles, each of the sub cycles has one duration and a cycle value; and transmit UL signaling during an active time.

* * * * *